United States Patent
Kamimoto et al.

(10) Patent No.: US 11,970,760 B2
(45) Date of Patent: Apr. 30, 2024

(54) METAL POWDER

(71) Applicant: DAIDO STEEL CO., LTD., Nagoya (JP)

(72) Inventors: Asako Kamimoto, Nagoya (JP); Kenji Sugiyama, Nagoya (JP); Takashi Yoshimoto, Nagoya (JP); Koichiro Inoue, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 0 days.

(21) Appl. No.: 17/982,854

(22) Filed: Nov. 8, 2022

(65) Prior Publication Data

US 2023/0144481 A1 May 11, 2023

(30) Foreign Application Priority Data

Nov. 10, 2021 (JP) .................. 2021-183725
May 30, 2022 (JP) .................. 2022-087488

(51) Int. Cl.
| | |
|---|---|
| *C22C 38/58* | (2006.01) |
| *B33Y 70/00* | (2020.01) |
| *C22C 38/00* | (2006.01) |
| *C22C 38/02* | (2006.01) |
| *C22C 38/06* | (2006.01) |

(Continued)

(52) U.S. Cl.
CPC .............. *C22C 38/58* (2013.01); *B33Y 70/00* (2014.12); *C22C 38/001* (2013.01); *C22C 38/002* (2013.01); *C22C 38/02* (2013.01); *C22C 38/06* (2013.01); *C22C 38/44* (2013.01); *C22C 38/46* (2013.01); *C22C 38/48* (2013.01)

(58) Field of Classification Search
None
See application file for complete search history.

(56) References Cited

U.S. PATENT DOCUMENTS

| | | |
|---|---|---|
| 2019/0061001 A1 | 2/2019 | Araie et al. |
| 2020/0232076 A1 | 7/2020 | Tidesten et al. |
| 2020/0391286 A1* | 12/2020 | Kuse ............... B22F 1/052 |

FOREIGN PATENT DOCUMENTS

| | | |
|---|---|---|
| EP | 2939763 A2 | 11/2015 |
| EP | 3738695 A1 | 11/2020 |

(Continued)

OTHER PUBLICATIONS

European Office Action, dated Mar. 6, 2023, in European Application No. 22206708.4.

*Primary Examiner* — Xiaowei Su
(74) *Attorney, Agent, or Firm* — MCGINN I.P. LAW GROUP, PLLC.

(57) ABSTRACT

The present invention relates to a metal powder containing: 0.001 mass %≤C≤0.45 mass %, 0.01 mass %≤Si≤3.50 mass %, Mn≤2.0 mass %, 7.5 mass %≤Cr≤21.0 mass %, 1.5 mass %≤Ni≤7.0 mass %, Mo≤1.3 mass %, 0.05 mass %≤V≤2.0 mass %, Al≤0.015 mass %, and N≤0.20 mass %, with the balance being Fe and unavoidable impurities, satisfying 0.05 mass %≤C+N≤0.58 mass %, and satisfying: 10<15C+Mn+0.5Cr+Ni<20 and $Cr_{eq}/Ni_{eq}<5.6$, where $Cr_{eq}$=Cr+Mo+1.5Si+0.5Nb, and $Ni_{eq}$=Ni+30C+30N+0.5Mn.

17 Claims, 4 Drawing Sheets

(51) Int. Cl.
  *C22C 38/44*    (2006.01)
  *C22C 38/46*    (2006.01)
  *C22C 38/48*    (2006.01)

(56) References Cited

FOREIGN PATENT DOCUMENTS

| | | | | |
|---|---|---|---|---|
| GB | 2009236 A | * | 6/1979 | ......... C22C 33/0285 |
| JP | 6295001 B1 | | 3/2018 | |
| JP | 2019-119913 A | | 7/2019 | |
| JP | 2020-536169 A | | 12/2020 | |
| WO | WO-0248418 A1 | * | 6/2002 | .............. B22F 3/115 |

* cited by examiner

FIG. 4

METAL POWDER

CROSS-REFERENCE TO RELATED APPLICATIONS

This application is based on and claims priority under 35 USC 119 from Japanese Patent Application No. 2021-183725 filed on Nov. 10, 2021 and Japanese Patent Application No. 2022-087488 filed on May 30, 2022, the contents of which are incorporated herein by reference.

TECHNICAL FIELD

The present invention relates to a metal powder, particularly to a metal powder from which an object having less cracks or warpage and having excellent heat resistance can be obtained through additive manufacturing.

BACKGROUND ART

In recent years, metal additive manufacturing technology has attracted attention. This is because the metal additive manufacturing technology has the following advantages:
  (a) a metal part having a complex shape can be formed in a shape close to a final shape;
  (b) a degree of freedom in design is improved; and
  (c) a cutting margin is less than that in cutting in the related art.

Here, the "additive manufacturing method" refers to a method of preparing a three-dimensional structure by stacking, using various methods, a thin layer corresponding to a structure obtained by slicing the three-dimensional structure in a horizontal direction. Examples of a method for stacking the thin layer include:
  (a) a method of repeating a step of forming a thin powder layer made of a metal powder and a step of locally melting and solidifying the powder layer by irradiation with an energy beam such as a laser beam or an electron beam, and
  (b) a method of stacking thin plates each having a given shape and diffusion-bonding the thin plates.

Among these, the additive manufacturing method of irradiating a spread metal powder layer with a laser beam to locally melt and solidify the powder layer is also called a "selective laser melting (SLM)". The SLM additive manufacturing method has an advantage that a complicated three-dimensional shape can be easily formed simply by changing an irradiation position of the laser beam. Therefore, when the SLM additive manufacturing method is applied to, for example, a preparation of a die casting mold, a non-linear or three-dimensional water-cooling circuit can be freely disposed inside the mold.

In the case where additive manufacturing is performed by using an SLM 3D printer, only the upper surface of the manufactured object is rapidly heated, so residual tensile stress is generated on the upper surface of the manufactured object after cooling. As a result, the manufactured object is likely to be deformed to be convex downward. When the deformation of the manufactured object is large, the dimensional accuracy of the manufactured object deteriorates, and it is also difficult to take out the manufactured object from the 3D printer after manufacturing.

Therefore, various proposals have been made in order to solve this problem in the related art.

For example, Patent Literature 1 discloses a method for producing an object through additive manufacturing, the method including:

a recoating step of forming a material layer made of a powder of a carbon steel or a martensitic stainless steel in a manufacturing region;
a solidification step of irradiating a predetermined irradiation region of the material layer with a laser beam to form a solidified layer; and
a temperature adjustment step of adjusting the temperature of the solidified layer such that $T_1 \to T_2 \to T_1$ (where $T_1 \geq Mf$ (martensite transformation finish temperature of solidified layer), $T_1 > T_2$, and $T_2 \leq Ms$ (martensite transformation start temperature of solidified layer).

The same literature discloses the following points:
  (a) in the additive manufacturing, the tensile stress remains in the solidified layer because the volume of the solidified layer generally shrinks during the cooling process of the solidified layer;
  (b) in the case of performing the additive manufacturing using a material that undergoes martensite transformation, since volume expansion occurs when the solidified layer undergoes martensite transformation, the volume shrinkage that occurs during the cooling of the solidified layer and the resulting tensile stress are reduced, and deformation of the manufactured object can be prevented;
  (c) the amount of transformation (=expansion amount) of the solidified layer can be controlled by controlling $T_1$ and $T_2$ in the temperature adjustment step; and
  (d) since Ms and Mf fluctuate depending on the carbon amount in the material, the method described in the same literature can be applied to various materials by adjusting the carbon amount in the material.

Patent Literature 2 discloses a metal powder containing predetermined amounts of Cr, Ni, C, Si, Mn, N, Mo, Cu, Nb, P, and S, with the balance being Fe and unavoidable impurities.

The same literature discloses that in the case of performing the additive manufacturing using a stainless steel powder, when the amount of each element contained in the stainless steel powder is adjusted within a predetermined range and the amounts of P and S are controlled, solidification cracks are less likely to occur and a good manufacturing property is exhibited.

Further. Patent Literature 3 does not disclose a metal powder for additive manufacturing, but discloses a stainless steel containing predetermined amounts of C, Si, Mn, Cr, Mo, V, and N, with the balance being Fe and impurities.

The same literature discloses that when the content of each element is within a predetermined range, a stainless steel having high hardness, high toughness, and good corrosion resistance can be obtained even after annealing at high temperature.

Patent Literature 1 discloses that when the temperature of the solidified layer is raised and lowered near the Ms point, the residual tensile stress generated during the cooling process after manufacturing is relaxed by volume expansion due to martensite transformation, and accordingly, a manufactured object with little distortion can be obtained. However, in the current 3D printer, there is an upper limit to a reachable temperature of the manufacturing region due to apparatus restrictions. Therefore, the method disclosed in Patent Literature 1 can be applied only to steels having an Ms point of about 300° C. or lower.

In addition, a heat-resistant martensitic steel such as SUH1, SUH3 and SUH11 is used for uses requiring heat resistance. In the case of using this type of heat-resistant steel, the carbon amount is usually high in order to increase the heat resistance. When a powder with such a high carbon amount is applied to additive manufacturing, the as-manufactured hardness tends to be very high. As a result, cracks may easily occur in the manufactured object, making it difficult to prepare the manufactured object.

In order to solve this problem, it is conceivable to reduce the carbon amount in the heat-resistant steel. However, since a decrease in carbon amount causes an increase in Ms point, the Ms point may be higher than a reachable temperature range of a manufacturing apparatus. As a result, there is a problem that the residual stress of the manufactured object increases when additive manufacturing is performed by using the heat-resistant steel powder with a reduced carbon amount.

Patent Literature 1: Japanese Patent No. 6295001
Patent Literature 2: JP2019-119913A
Patent Literature 3: JP2020-536169T

SUMMARY OF INVENTION

An object of the present invention is to provide a metal powder from which an object having less cracks or warpage and having excellent heat resistance can be obtained through additive manufacturing.

In order to solve the above problems, a metal powder according to the present invention contains:
0.001 mass %≤C≤0.45 mass %,
0.01 mass %≤Si≤3.50 mass %,
Mn≤2.0 mass %,
7.5 mass %≤Cr≤21.0 mass %,
1.5 mass %≤Ni≤7.0 mass %,
Mo≤1.3 mass %,
0.05 mass %≤V≤2.0 mass %,
Al≤0.015 mass %, and
N≤0.20 mass %,
with the balance being Fe and unavoidable impurities, satisfies:
0.05 mass %≤C+N≤0.58 mass %, and
also satisfies the following expression (1) and expression (2).

$$10 < 15C + Mn + 0.5Cr + Ni < 20 \tag{1}$$

$$Cr_{eq}/Ni_{eq} < 5.6 \tag{2}$$

where $$Cr_{eq} = Cr + Mo + 1.5Si + 0.5Nb$$

$$Ni_{eq} = Ni + 30C + 30N + 0.5Mn$$

When additive manufacturing is performed by using a metal powder that contains predetermined elements and satisfies the expression (1), residual tensile stress generated in the cooling process after manufacturing is relaxed by volume expansion due to martensite transformation. As a result, an object having less cracks and less distortion can be obtained through additive manufacturing.

Further, by optimizing the components of the metal powder to satisfy the expression (2) (in particular, optimizing the amounts of Si, Cr, and Ni), an object having excellent heat resistance can be obtained through additive manufacturing.

DESCRIPTION OF EMBODIMENTS

Hereinafter, an embodiment of the present invention will be described in detail.

[1. Metal Powder]
[1.1. Main Constituent Elements]

A metal powder according to the present invention contains the following elements, with the balance being Fe and unavoidable impurities. The types of the added elements, component ranges thereof, and the reasons for limitation are as follows.

(1) 0.001 Mass %≤C≤0.45 Mass %:

C is an element that forms a carbide with various elements and is effective in improving hardness and strength. In addition, C is also an effective element for lowering Ms point. In order to obtain such effects, the amount of C is required to be 0.001 mass % or more. The amount of C is preferably 0.01 mass % or more, and more preferably 0.05 mass % or more.

On the other hand, when additive manufacturing is performed by using a metal powder, the hardness of the manufactured object immediately after the additive manufacturing is proportional to the total amount of C and N. Therefore, in the case where the amount of C is excessive, the hardness of the manufactured object immediately after additive manufacturing is too high, which may cause cracks. Therefore, the amount of C is required to be 0.45 mass % or less. The amount of C is preferably 0.40 mass % or less. The amount of C is more preferably 0.09 mass % or less, and further preferably 0.06 mass % or less.

(2) 0.01 Mass %≤Si≤3.50 Mass %:

Si is an element effective as a deoxidizing agent. In addition, Si is also an effective element for improving heat resistance and oxidation resistance of the manufactured object. In order to obtain such effects, the amount of Si is required to be 0.01 mass % or more. The amount of Si is preferably 0.1 mass % or more, and more preferably 0.3 mass % or more.

On the other hand, in the case where the amount of Si is excessive, toughness of the manufactured object may decrease. Therefore, the amount of Si is required to be 3.50 mass % or less. The amount of Si is preferably 3.2 mass % or less, more preferably 2.00 mass % or less, and further preferably 1.00 mass % or less.

(3) Mn≤2.0 Mass %:

Mn is an element effective as a deoxidizing element and a desulfurizing element. In addition, Mn is an effective element for improving toughness and tensile strength. Further, Mn is also an effective element for lowering Ms point. Therefore, the metal powder may contain Mn as needed. In order to obtain the above effects, the amount of Mn is preferably 0.01 mass % or more. The amount of Mn is more preferably 0.2 mass % or more.

On the other hand, Mn is also an austenite stabilizing element. Therefore, in the case where the amount of Mn is excessive, the amount of residual austenite is excessive, and hardness and corrosion resistance of the manufactured object may decrease. Therefore, the amount of Mn is required to be 2.0 mass % or less. The amount of Mn is preferably 1.8 mass % or less, more preferably 1.6 mass % or less, still preferably 1.00 mass % or less, and further preferably 0.70 mass % or less.

(4) 7.5 Mass %≤Cr≤21.0 Mass %:

Cr is an effective element for improving high temperature oxidation resistance. In addition, Cr is an effective element for improving quenching hardness of the manufactured object by forming a carbide. Further, Cr is also an effective element for forming a passive film on the surface of the manufactured object and ensuring corrosion resistance. In order to obtain such effects, the amount of Cr is required to be 7.5 mass % or more. The amount of Cr is preferably 10.5 mass % or more, and more preferably 11.5 mass % or more. On the other hand, in the case where the amount of Cr is excessive, the ferrite structure may remain even in the quenched structure, leading to a decrease in high temperature strength. Therefore, the amount of Cr is required to be 21.0 mass % or less. The amount of Cr is preferably 20.0 mass % or less, more preferably 18.5 mass % or less, still preferably 16.0 mass % or less, and further preferably 15.0 mass % or less.

(5) 1.5 Mass %≤Ni≤7.0 Mass %:

Ni is an effective element for improving corrosion resistance and hot strength. In addition, Ni is also an element that effectively lowers Ms point. In order to obtain such effects, the amount of Ni is required to be 1.5 mass % or more, more preferably 3.00 mass % or more, further preferably 4.00 mass % or more, and still preferably 5.00 mass % or more.

On the other hand, in the case where the amount of Ni is excessive, Ms point is greatly lowered. As a result, the amount of residual austenite may be excessive, and temper hardness may decrease. Therefore, the amount of Ni is required to be 7.0 mass % or less.

(6) Mo≤1.3 Mass %:

Mo has an effect of promoting regeneration of a passive film and enhancing corrosion resistance. Therefore, the metal powder may contain Mo as needed. In order to obtain such effects, the amount of Mo is preferably 0.01 mass % or more. The amount of Mo is more preferably 0.1 mass % or more.

On the other hand, in the case where the amount of Mo is excessive, fracture toughness of the manufactured object may decrease. Therefore, the amount of Mo is required to be 1.3 mass % or less. The amount of Mo is preferably 1.1 mass % or less, more preferably 0.90 mass % or less, and further preferably 0.50 mass % or less.

(7) 0.05 Mass %≤V≤2.0 Mass %:

V is an element that combines with C and/or N to form a carbide and/or a nitride and contributes to an improvement in hardness. In addition, V is also an element that prevents coarsening of crystal grains during quenching and contributes to an improvement in toughness. In order to obtain such effects, the amount of V is required to be 0.05 mass % or more. The amount of V is preferably 0.1 mass % or more.

On the other hand, in the case where the amount of V is excessive, a large amount of carbide and/or nitride may remain and toughness may decrease. Therefore, the amount of V is required to be 2.0 mass % or less. The amount of V is preferably 1.3 mass % or less, more preferably 0.8 mass % or less, and further preferably 0.5 mass % or less.

(8) Al≤0.015 Mass %:

Al is an element effective as a deoxidizing element. In addition, a small amount of Al prevents grain coarsening during quenching and may contribute to an improvement in toughness. Therefore, the metal powder may contain Al as needed. In order to obtain such effects, the amount of Al is preferably more than 0.002 mass %. The amount of Al is more preferably 0.005 mass % or more.

On the other hand, in the case where the amount of Al is excessive, coarse AlN is formed, which may lead to a great deterioration in toughness and fatigue properties. Therefore, the amount of Al is required to be 0.015 mass % or less.

(9) N≤0.20 Mass %:

N is an element mixed into the metal powder when the molten metal is powdered by nitrogen atomization. In addition, N has an effect of increasing hardness of the manufactured object immediately after additive manufacturing. Therefore, the metal powder may contain N as needed. In order to obtain such effects, the amount of N is preferably 0.01 mass % or more.

On the other hand, in the case where the amount of N is excessive, hardness of the manufactured object immediately after additive manufacturing is too high, which may cause cracks. Therefore, the amount of N is required to be 0.20 mass % or less. The amount of N is preferably 0.1 mass % or less, and more preferably 0.07 mass % or less.

(10) 0.05 Mass %≤C+N≤0.58 Mass %:

Both C and N are effective elements for improving hardness and strength. In addition, C and N are also effective elements for lowering Ms point. In the case where C+N is too small, required hardness cannot be obtained. Therefore, C+N is required to be 0.05 mass % or more.

On the other hand, in the case where C+N is excessive, hardness of the manufactured object immediately after additive manufacturing is too high, which may cause cracks. Therefore, C+N is required to be 0.58 mass % or less. C+N is preferably 0.45 mass % or less.

(11) Unavoidable Impurities:

The metal powder according to the present invention may contain the components shown below in the amounts shown below. In such cases, these components are treated as unavoidable impurities in the present invention.

Cu≤0.30 mass %, O≤0.1 mass %, Co≤0.3 mass %, Ta≤0.05 mass %, Ti≤0.05 mass %, Zr≤0.05 mass %, B≤0.005 mass %, Ca≤0.005 mass %, Se≤0.03 mass %, Te≤0.005 mass %, Bi≤0.01 mass %, Pb≤0.03 mass %, Mg≤0.02 mass %, and REM≤0.01 mass %.

[1.2. Auxiliary Constituent Elements]

The metal powder according to the present invention may further contain one or more of the following elements in addition to the above main constituent elements. The types of the added elements, component ranges thereof, and the reasons for limitation are as follows.

(1) 0.1 Mass %≤Nb≤1.0 Mass %:

Similar to V, Nb is an element that combines with C and/or N to form a carbide and/or a nitride and contributes to an improvement in hardness. In addition, Nb is also an element that prevents coarsening of crystal grains during quenching and contributes to an improvement in toughness. In order to obtain such effects, the amount of Nb is preferably 0.1 mass % or more. Nb may be contained in an amount of less than 0.1 mass % as an unavoidable impurity.

On the other hand, in the case where the amount of Nb is excessive, a coarse carbide and/or nitride may be precipitated to abet quench cracks. Therefore, the amount of Nb is preferably 1.0 mass % or less.

(2) 0.1 Mass % ≤ W ≤ 1.5 Mass %:

W has an effect of improving corrosion resistance. In order to obtain such effects, the amount of W is preferably 0.1 mass % or more. W may be contained in an amount of less than 0.1 mass % as an unavoidable impurity.

On the other hand, in the case where the amount of W is excessive, the cost is increased, and a $M_6C$-type coarse carbide is formed, which may abet quench cracks. Therefore, the amount of W is preferably 1.5 mass % or less.

(3) P ≤ 0.03 Mass %:

P is an unavoidable impurity, and from the viewpoint of preventing solidification cracks, it is preferable to reduce the amount of P as much as possible. In order to prevent solidification cracks, the amount of P as an unavoidable impurity is preferably 0.03 mass % or less.

However, reducing the amount of P excessively causes a rise in production cost. Therefore, it is preferable to select the optimum amount of P in consideration of these points.

(4) S ≤ 0.03 Mass %:

S is an unavoidable impurity, and from the viewpoint of preventing solidification cracks, it is preferable to reduce the amount of S as much as possible. In order to prevent solidification cracks, the amount of S as an unavoidable impurity is preferably 0.03 mass % or less.

However, reducing the amount of S excessively causes a rise in production cost. Therefore, it is preferable to select the optimum amount of S in consideration of these points.

[1.3. Component Balances]

The metal powder according to the present invention is required to satisfy the following expression (1) and expression (2).

$$10 < 15C + Mn + 0.5Cr + Ni < 20 \quad (1)$$

$$Cr_{eq}/Ni_{eq} < 5.6 \quad (2)$$

where $$Cr_{eq} = Cr + Mo + 1.5Si + 0.5Nb$$

$$Ni_{eq} = Ni + 30C + 30N + 0.5Mn$$

[1.3.1, Expression (1)]

The "15C+Mn+0.5Cr+Ni" (hereinafter, also referred to as a "variable A") in the expression (1) correlates to the Ms point of the metal powder. All of the elements in the variable A have the effect of lowering Ms point. In the metal powder according to the present invention, when the variable A is optimized to satisfy the expression (1), the Ms point of the metal powder can be set in a range suitable for additive manufacturing (specifically, about 50° C. to about 280° C.).

The variable A is obtained by multiplying the content (mass %) of each element by a predetermined coefficient and adding them together. In the case where the metal powder does not contain some of the elements that constitute the variable A, the content of the element is assumed to be zero to calculate the variable A.

In the case where the Ms point of the metal powder is too low, the amount of residual austenite after additive manufacturing is excessive, and sufficient hardness cannot be obtained. In addition, even when the material is cooled to room temperature after additive manufacturing, the amount of martensite transformation is low and thus, an effect of reducing distortion due to transformation expansion may not be obtained. Therefore, the Ms point is preferably 50° C. or higher. The variable A is preferably less than 20 in order to achieve the Ms point to be equal to or greater than the above value.

On the other hand, in order to obtain the effect of reducing distortion due to transformation expansion, it is necessary to heat the manufactured object after additive manufacturing to a temperature lower than the Ms point and higher than a temperature at which the martensite transformation is completely completed (Mf point). The current additive manufacturing apparatus can only heat up to 200° C. due to equipment restrictions. In the case where the heating temperature for the manufactured object is 200° C. and the Ms point of the metal powder is higher than 280° C., the heating temperature is too low and thus, the martensite transformation is almost completed immediately after additive manufacturing, and the effect of reducing distortion due to transformation expansion cannot be obtained.

Even if it is possible to heat the additively manufactured object to 200° C. or higher, in the case where the Ms point is 280° C. or higher, the temperature required for heating is equal to or higher than the temperature at which bainite transformation occurs. Therefore, expansion due to bainite transformation occurs during manufacturing, and the effect of reducing distortion due to transformation expansion cannot be obtained. Therefore, the Ms point is preferably 280° C. or lower. The variable A is preferably more than 10 in order to achieve the Ms point to be equal to or smaller than the above value.

[1.3.2. Expression (2)]

The expression (2) represents the ratio of a Cr equivalent ($Cr_{eq}$) to a Ni equivalent ($Ni_{eq}$) (hereinafter also referred to as an "equivalent ratio"). The "$Cr_{eq}$" is an index representing the ease with which ferrite is formed in a stainless steel. In addition, the "$Ni_{eq}$" is an index representing the ease with which austenite is formed in a stainless steel.

The $Cr_{eq}$ is obtained by multiplying the content (mass %) of each ferrite-stabilizing element by a predetermined coefficient and adding them together. In addition, the $Ni_{eq}$ is obtained by multiplying the content (mass %) of each austenite-stabilizing element by a predetermined coefficient and adding them together. In the case where the metal powder does not contain some of the elements that constitute the $Cr_{eq}$ or the $Ni_{eq}$, the content of the element is assumed to be zero to calculate the $Cr_{eq}$ or the $Ni_{eq}$.

In the case where the equivalent ratio is too large, a ferrite structure may be formed in all phases, and high temperature strength may decrease. Therefore, the equivalent ratio is required to be less than 5.6. The equivalent ratio preferably satisfies the following expression (2').

$$Cr_{eq}/Ni_{eq} < 2.5 \quad (2')$$

On the other hand, in the case where the equivalent ratio is too small, the amount of residual austenite is excessive, and hardness and corrosion resistance of the manufactured object may decrease. Therefore, the equivalent ratio is preferably 0.3 or more. The equivalent ratio is more preferably 0.4 or more, and still more preferably 0.6 or more.

[1.4. Powder Properties]

In the SLM 3D printer, the metal powder is uniformly spread before manufacturing with a laser. The fluidity of the metal powder is important for uniformly spreading the metal powder. In order to ensure the fluidity, the powder properties of the metal powder (in particular, a number frequency $D_{50}$ and an avalanche angle) may be optimized.

[1.4.1. Number Frequency $D_{50}$]

The term "number frequency $D_{50}$ (μm)" refers to the cumulative 50% of the number particle diameter (median diameter) of the powder. Examples of a method of measuring $D_{50}$ include:

(a) a measurement method using a particle distribution measuring apparatus based on a laser diffraction/scattering method;
(b) a measurement method using a particle image analyzer;
(c) a measurement method using a coulter counter; and the like.

In the present invention, the term "$D_5O$" refers to the median diameter measured by a particle image analyzer.

In general, the content of fine powder (particles having a particle diameter of 10 μm or less) increases relatively as $D_{50}$ increases. An adhesive force generated between particles, such as a van der Waals force and an electrostatic force increases as the particle diameter decreases. Therefore, in the case where $D_{50}$ is too small, the powder tends to agglomerate, resulting in poor fluidity. Therefore, $D_{50}$ is preferably 10 μm or more. $D_{50}$ is more preferably 20 μm or more, and further preferably 30 μm or more.

On the other hand, in the case where $D_{50}$ is too large, frictional force generated on the powder surface is more dominant than the adhesive force generated between particles. Therefore, shear resistance during powder flow is increased, and the fluidity is inhibited. Therefore, $D_{50}$ is preferably 50 μm or less.

[1.4.2. Avalanche Angle]

Examples of a method of evaluating fluidity of the metal powder include:
(a) the metal powder—fluidity measurement method specified in JIS Z2502:2012;
(b) ASTM B213 Standard Test Methods for Flow Rate of Metal Powders Using the Hall Flowmeter Funnel;
(c) ASTM B964 Standard Test Methods for Flow Rate of Metal Powders Using the Carney Funnel; and the like.

On the other hand, as an index for evaluating fluidity suitable for the powder spreading step in a metal 3D printer, there is an avalanche angle that can be measured by a revolution powder analyzer manufactured by Mercury Scientific. In the present invention, the avalanche angle is used as an index of the fluidity of the metal powder.

In general, a small avalanche angle indicates a small adhesive force between particles and good fluidity of the metal powder. The avalanche angle usually takes a value of 30° to 60°, depending on the $D_{50}$ of the metal powder. The avalanche angle is preferably 45° or less in order to more uniformly spread the metal powder in the manufacturing region of the 3D printer. The avalanche angle is more preferably 43° or less, further preferably 40° or less, and still more preferably 35° or less.

[1.4.3. Apparent Density, Tapped Density, and Hausner Ratio]

Examples of a method of measuring an apparent density include:
(a) the metal powder—apparent density measurement method specified in JIS Z2504:2012;
(b) a method in accordance with ASTM 9212 Standard Test Method for Apparent Density of Free-Flowing Metal Powders Using the Hall Flowmeter Funnel; and the like.

In the present invention, the term "apparent density $\rho_{bulk}$" refers to a value obtained by the metal powder—apparent density measurement method specified in JIS Z2504:2012. The apparent density of the metal powder can usually take values of about 3.0 g/cc to about 6.0 g/cc.

Examples of a method of measuring a tapped density include:
(a) the metal powder—tapped density measurement method specified in JIS Z2512:2012;
(b) a method in accordance with ASTM B527 Standard Test Method for Tap Density of Metal Powders and Compounds; and the like.

In the present invention, the term "tapped density $\rho_{tapped}$" refers to a value obtained by the metal powder—tapped density measurement method specified in JIS Z2512:2012. The tapped density of the metal powder can usually take values of about 3.0 g/cc to about 6.0 g/cc.

The term "Hausner ratio" refers to the ratio ($=\rho_{tapped}/\rho_{bulk}$) of the tapped density ($\rho_{tapped}$) to the apparent density ($\rho_{bulk}$) of the metal powder. A small Hausner ratio generally means weak inter-particle interaction and high fluidity. Conversely, a large Hausner ratio generally indicates strong inter-particle interaction and poor fluidity. The Hausner ratio of the metal powder can usually take values of about 1.25 or less.

[1.4.4. Particle Shape]

The particle shape of the metal powder may be spherical or irregular. In general, a metal powder composed of spherical particles exhibits fluidity higher than that of a metal powder composed of irregularly-shaped particles.

[1.5. Use]

The metal powder according to the present invention can be used for various uses, and is particularly suitable as a metal powder for additive manufacturing.

The as-manufactured hardness of the object produced by additive manufacturing using the metal powder according to the present invention mainly depends on the composition of the metal powder. In the case where the as-manufactured hardness is too high, cracks may occur. In order to prevent cracks during manufacturing, the as-manufactured hardness is preferably 58 HRC or less. The as-manufactured hardness is more preferably 55 HRC or less. An object having such as-manufactured hardness can be obtained through additive manufacturing by optimizing the composition of the metal powder.

[2. Method for Producing Metal Powder]

In the present invention, the method for producing the metal powder is not particularly limited. Examples of the method for producing the metal powder include a gas atomization method, a water atomization method, a plasma atomization method, a plasma rotating electrode method, a centrifugal force atomization method, and the like.

For example, in the case of producing the metal powder by using a gas atomization method, a high-pressure gas is blown onto the molten metal while the molten metal is dropped from a bottom of a tundish, to thereby pulverize and solidify the molten metal. In this case, an inert gas such as nitrogen gas, argon gas or helium gas is used as the high-pressure gas. In the case of producing the metal powder by using a gas atomization method, impurities such as P, S, Cu, Co, Ti, Zr, and Nb may be mixed unavoidably.

Further, the metal powder may be produced by mixing two or more types of metal powders and using, for example, a mechanical alloying method.

In addition, after producing the metal powder by using any one of the methods, the metal powder may be further subjected to a spheroidizing treatment using reducing thermal plasma. Alternatively, in order to improve fluidity of the metal powder, the particle surface may be coated with an appropriate amount of nanoparticles after the powder is produced. The particle diameter distribution of the metal powder can be controlled by production conditions, and can also be controlled by classification methods such as a wet cyclone, a dry cyclone, a dry sieve, and an ultrasonic sieve.

[3. Method for Producing Object Through Additive Manufacturing]

Examples of additive manufacturing methods using a metal 3D printer include a powder bed fusion method, a direct energy deposition method, a binder-jetting method, and the like. In addition, cutting of the additively manufactured object may be performed during the manufacturing. The metal powder according to the present invention can be applied to any of the above methods.

For example, in the case of the selective laser melting method (SLM method), which is one of the powder bed fusion method, the additive manufacturing can be performed by:
(a) creating slice data in units of several tens of μm based on three-dimensional shape data (e.g., STL data) generated by 3D-CAD or the like, and
(b) selectively scanning and irradiating the powder bed with a heat source based on the slice data to obtain a sintered layer, and stacking the sintered layer.

[4. Effect]

C, Mn, Cr, and Ni in steel all have the effect of lowering Ms point. Therefore, when the amount of C is relatively reduced and the contents of these elements are optimized to satisfy the expression (1), the Ms point can be maintained within a range (about 50° C. to about 280° C.) suitable for low distortion of the additively manufactured object without excessively increasing the as-manufactured hardness.

In addition, when the contents of elements are optimized to satisfy the expression (2), it is possible to prevent the formation of the ferrite phase, which reduces heat resistance. Among the elements in the expression (2), Si, Cr and Ni in particular have the effect of improving heat resistance of the additively manufactured object. Therefore, by optimizing the contents of the elements in the expression (2) while satisfying the expression (2), heat resistance of the additively manufactured object can be maintained.

EXAMPLES

Examples 1 to 24 and Comparative Examples 1 to 7

[1. Preparation of Sample]
[1.1. Preparation of Metal Powder]

By using a gas atomization method, 31 types of steel powders having compositions shown in Table 1 and Table 2 (balance is Fe) were prepared. The steel powder listed in Table 1 and Table 2 may contain elements not listed in the tables as impurities within the above specified amounts in addition to Fe as balance. In addition, the blank in Table 1 and Table 2 indicates less than 0.01 mass % for Mn, Ni, Mo, V, S, Nb, and W, and less than 0.002 mass % for Al. Further, Comparative Example 1 corresponds to a heat-resistant martensitic steel (SUH11), and Comparative Example 2 corresponds to a heat-resistant martensitic steel (SUH1).

TABLE 1

| | Composition (mass %) | | | | | | | | | | | | | | Variable | | | |
| --- | --- | --- | --- | --- | --- | --- | --- | --- | --- | --- | --- | --- | --- | --- | --- | --- | --- | --- |
| | C | Si | Mn | Cr | Ni | Mo | V | P | S | Al | Nb | W | N | C + N | A | $Cr_{eq}$ | $Ni_{eq}$ | $Cr_{eq}/Ni_{eq}$ |
| Ex. 1 | 0.20 | 0.50 | 1.05 | 9.50 | 3.56 | 0.34 | 0.53 | 0.01 | 0.01 | 0.014 | | | 0.014 | 0.214 | 12.4 | 10.59 | 10.51 | 1.01 |
| Ex. 2 | 0.02 | 1.20 | 1.42 | 12.20 | 6.50 | 0.20 | 0.18 | 0.01 | 0.05 | 0.012 | | | 0.040 | 0.060 | 14.3 | 14.20 | 9.01 | 1.58 |
| Ex. 3 | 0.24 | 1.50 | 0.50 | 13.48 | 1.55 | 0.45 | 0.15 | 0.02 | 0.01 | 0.011 | | | 0.020 | 0.260 | 12.4 | 16.18 | 9.60 | 1.69 |
| Ex. 4 | 0.20 | 2.10 | 0.33 | 11.52 | 3.50 | 1.10 | 0.14 | 0.01 | 0.01 | | | | 0.018 | 0.218 | 12.6 | 15.77 | 10.21 | 1.55 |
| Ex. 5 | 0.26 | 3.30 | 0.35 | 10.47 | 2.87 | 0.27 | 0.22 | 0.01 | 0.01 | 0.011 | | | 0.013 | 0.273 | 12.4 | 15.69 | 11.24 | 1.40 |
| Ex. 6 | 0.05 | 0.50 | 1.80 | 12.79 | 6.21 | 0.14 | 0.10 | 0.01 | | 0.008 | | | 0.070 | 0.120 | 15.2 | 13.68 | 10.71 | 1.28 |
| Ex. 7 | 0.29 | 0.85 | 0.94 | 10.92 | 1.32 | 0.33 | 0.20 | 0.01 | 0.01 | 0.015 | | | 0.024 | 0.314 | 12.1 | 12.53 | 11.21 | 1.12 |
| Ex. 8 | 0.20 | 1.80 | 0.40 | 11.39 | 2.33 | 0.40 | 0.27 | 0.01 | 0.01 | | | | 0.022 | 0.222 | 11.4 | 14.49 | 9.19 | 1.58 |
| Ex. 9 | 0.22 | 1.30 | 0.75 | 12.80 | 1.60 | | 0.24 | 0.01 | 0.01 | 0.009 | | | 0.019 | 0.239 | 12.1 | 14.75 | 9.15 | 1.61 |
| Ex. 10 | 0.40 | 0.20 | 0.40 | 15.50 | 1.53 | 1.28 | 0.31 | 0.02 | 0.01 | 0.013 | | | 0.165 | 0.565 | 15.7 | 17.08 | 18.68 | 0.91 |
| Ex. 11 | 0.27 | 0.95 | 1.20 | 12.20 | 1.98 | 0.21 | 0.22 | 0.01 | 0.02 | 0.007 | | | 0.018 | 0.288 | 13.3 | 13.84 | 11.22 | 1.23 |
| Ex. 12 | 0.25 | 2.60 | | 10.60 | 2.80 | 0.51 | 0.32 | 0.04 | 0.02 | | | | 0.029 | 0.279 | 11.9 | 15.01 | 11.17 | 1.34 |
| Ex. 13 | 0.22 | 0.38 | 1.60 | 16.50 | 2.20 | 0.32 | 0.10 | 0.01 | 0.01 | 0.009 | | | 0.027 | 0.247 | 15.4 | 17.39 | 10.41 | 1.67 |
| Ex. 14 | 0.25 | 0.08 | 1.80 | 18.80 | 3.92 | 0.21 | 0.05 | 0.01 | 0.01 | | | | 0.012 | 0.262 | 18.9 | 19.13 | 12.68 | 1.51 |
| Ex. 15 | 0.38 | 3.20 | | 8.50 | 2.80 | 0.85 | 0.51 | 0.01 | 0.02 | 0.010 | | | 0.020 | 0.400 | 12.8 | 14.15 | 14.80 | 0.96 |
| Ex. 16 | 0.39 | 0.80 | 1.00 | 8.50 | 3.40 | | 0.34 | 0.01 | 0.01 | 0.010 | | | 0.022 | 0.412 | 14.5 | 9.70 | 16.26 | 0.60 |

TABLE 2

| | Composition (mass %) | | | | | | | | | | | | | | Variable | | | |
| --- | --- | --- | --- | --- | --- | --- | --- | --- | --- | --- | --- | --- | --- | --- | --- | --- | --- | --- |
| | C | Si | Mn | Cr | Ni | Mo | V | P | S | Al | Nb | W | N | C + N | A | $Cr_{eq}$ | $Ni_{eq}$ | $Cr_{eq}/Ni_{eq}$ |
| Ex. 17 | 0.33 | 0.90 | 1.10 | 10.60 | 3.85 | 1.30 | 0.22 | 0.01 | 0.01 | 0.011 | | | 0.019 | 0.349 | 15.2 | 13.25 | 14.87 | 0.89 |
| Ex. 18 | 0.31 | 0.80 | 1.75 | 11.20 | 3.91 | 1.01 | 0.42 | 0.02 | 0.01 | | | | 0.020 | 0.330 | 15.9 | 13.41 | 14.69 | 0.91 |
| Ex. 19 | 0.09 | 2.40 | | 17.30 | 2.20 | 0.23 | 0.06 | 0.01 | 0.01 | 0.014 | | | 0.050 | 0.140 | 12.2 | 21.13 | 6.40 | 3.30 |
| Ex. 20 | 0.18 | 0.40 | 0.80 | 12.50 | 3.45 | 0.70 | 0.24 | 0.01 | 0.02 | | 0.5 | | 0.085 | 0.265 | 13.2 | 14.05 | 11.80 | 1.19 |
| Ex. 21 | 0.22 | 0.28 | 0.75 | 12.20 | 2.50 | 0.98 | 0.26 | 0.01 | 0.01 | | | 1.1 | 0.040 | 0.260 | 12.7 | 13.60 | 10.68 | 1.27 |
| Ex. 22 | 0.24 | 2.47 | | 11.80 | 2.70 | 0.44 | 0.21 | 0.02 | 0.02 | 0.008 | 0.3 | | 0.029 | 0.269 | 12.2 | 16.10 | 10.77 | 1.49 |
| Ex. 23 | 0.30 | 0.88 | 0.90 | 10.70 | 3.20 | 0.23 | 0.22 | 0.01 | 0.01 | 0.007 | | 0.6 | 0.024 | 0.324 | 14.0 | 12.25 | 13.37 | 0.92 |
| Ex. 24 | 0.23 | 1.45 | 0.45 | 13.52 | 1.65 | 0.45 | 0.22 | 0.02 | 0.01 | 0.011 | 0.7 | 0.2 | 0.020 | 0.250 | 12.3 | 16.50 | 9.38 | 1.76 |
| Comp. Ex. 1 | 0.53 | 1.70 | 0.40 | 8.90 | 0.30 | | | 0.01 | 0.01 | | | | 0.012 | 0.542 | 13.1 | 11.45 | 16.76 | 0.68 |
| Comp. Ex. 2 | 0.49 | 3.10 | 0.37 | 8.70 | | | | 0.01 | 0.02 | | | | 0.020 | 0.510 | 12.1 | 13.35 | 15.49 | 0.86 |
| Comp. Ex. 3 | 0.11 | 0.80 | 0.65 | 12.82 | 0.20 | 0.34 | 0.21 | 0.02 | 0.01 | 0.012 | | | 0.023 | 0.133 | 8.9 | 14.36 | 4.52 | 3.18 |
| Comp. Ex. 4 | 0.13 | 0.75 | 0.68 | 18.60 | 9.60 | 0.35 | 0.21 | 0.01 | 0.01 | 0.014 | | | 0.028 | 0.158 | 21.5 | 20.08 | 14.68 | 1.37 |

TABLE 2-continued

| | Composition (mass %) | | | | | | | | | | | | | Variable | | | |
|---|---|---|---|---|---|---|---|---|---|---|---|---|---|---|---|---|---|
| | C | Si | Mn | Cr | Ni | Mo | V | P | S | Al | Nb | W | N | C + N | A | $Cr_{eq}$ | $Ni_{eq}$ | $Cr_{eq}/Ni_{eq}$ |
| Comp. Ex. 5 | 0.12 | 3.20 | | 24.50 | 1.20 | 1.80 | 0.27 | 0.01 | 0.02 | 0.011 | | | 0.018 | 0.138 | 15.3 | 31.10 | 5.34 | 5.82 |
| Comp. Ex. 6 | 0.15 | 3.70 | 4.50 | 19.50 | 3.55 | 0.32 | 0.36 | 0.01 | 0.01 | 0.019 | | | 0.023 | 0.173 | 20.1 | 25.37 | 10.99 | 2.31 |
| Comp. Ex. 7 | 0.37 | 0.19 | 0.11 | 5.80 | 1.20 | 0.32 | 0.23 | 0.01 | 0.01 | 0.017 | | | 0.023 | 0.393 | 9.8 | 6.41 | 13.05 | 0.49 |

[1.2. Preparation of Additively Manufactured Object]

An object (a cube of 15 mm×15 mm×15 mm) for measuring Ms point and as-manufactured hardness was prepared through additive manufacturing using a metal 3D printer M2 manufactured by Concept Laser.

In addition, an object (a cuboid of a length of 18 mm, a width of 30 mm, and a height of 10 mm) was formed on a strip-shaped base plate (a length of 20 mm, a width of 150 mm, and a height of 15 mm) through additive manufacturing using a metal 3D printer M2 manufactured by Concept Laser, to prepare a test specimen for measuring the amount of warpage after manufacturing.

Additive manufacturing was performed while preheating the additively manufactured object to a temperature of Ms−30° C. to Ms−80° C. by using a heater. The atmosphere during the manufacturing was a nitrogen atmosphere.

[2. Test Method]

[2.1. Ms Point]

A test piece (φ4 mm×10 mm) for transformation point measurement was cut out from the additively manufactured object in an as-manufactured state. The test piece was heated to 1,000° C. to 1,300° C., then cooled to 20° C. at a cooling rate of 100° C./min, and a temperature change and a dimensional change during cooling were measured.

Figure 1:
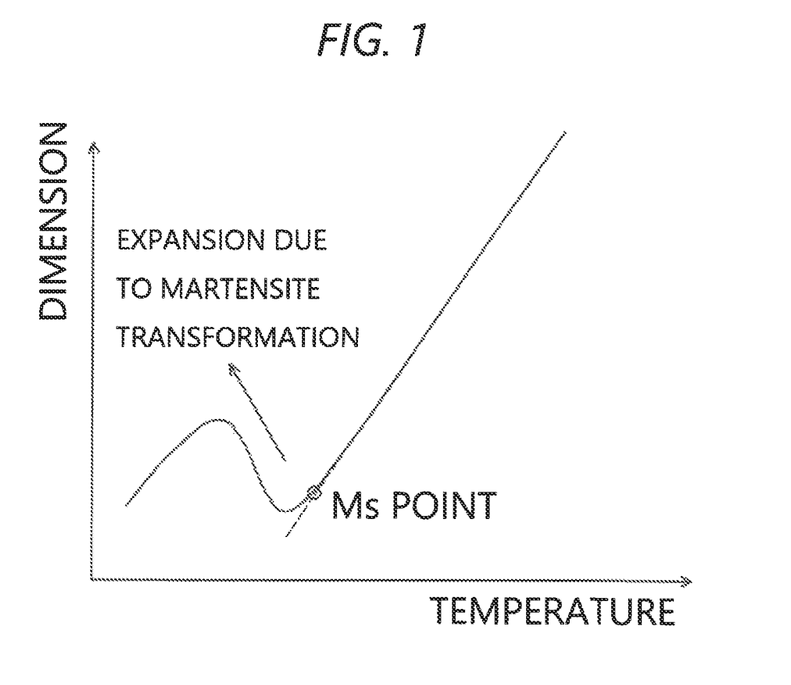
FIG. 1 is a diagram showing an example of a relationship between a temperature change and a dimensional change when a sample for transformation point measurement is cooled at a predetermined cooling rate.

FIG. 1 shows an example of a relationship between the temperature change and the dimensional change when a sample for transformation point measurement is cooled at a predetermined cooling rate. As shown in FIG. 1, the temperature at which thermal shrinkage changed to thermal expansion was taken as the martensite transformation start temperature (Ms).

[2.2. As-Manufactured Hardness]

A test piece for hardness measurement was cut out from the vicinity of the central portion of the additively manufactured object in an as-manufactured state. The Rockwell hardness (JIS Z2245: 2016) of the obtained test piece was measured.

[2.3. Distortion after Manufacturing and Presence or Absence of Cracks]

Figure 2A:
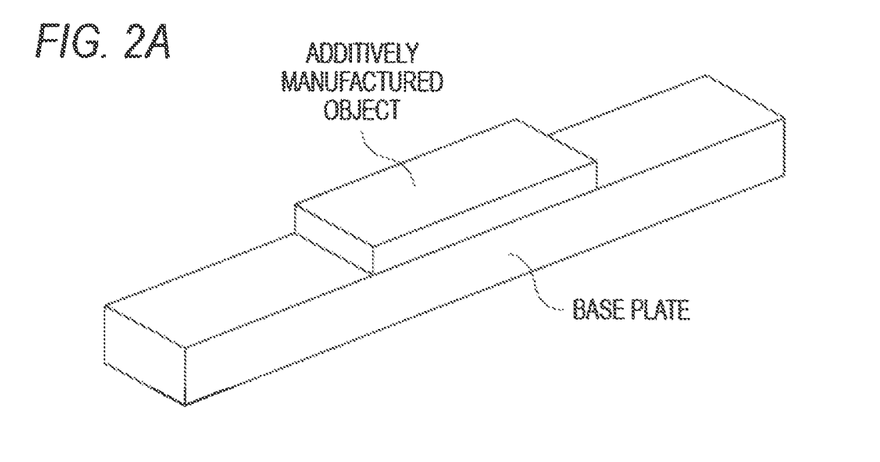
FIG. 2A is a schematic diagram of a test specimen for measuring the amount of warpage.

FIG. 2A is a schematic diagram of the test specimen for measuring the amount of warpage. After completion of the additive manufacturing, the base plate with the additively manufactured object was taken out from the metal 3D printer M2, and the base plate with the additively manufactured object was placed on a surface plate. An appearance photograph of the manufactured object as a whole was taken from a horizontal direction. A curvature radius R and a thickness t of the additively manufactured object were calculated by image analysis on the appearance photograph. Then, the distortion after manufacturing was calculated by the following equation (3).

$$\text{Distortion after manufacturing (\%)} = t \times 100/(2R+t) \quad (3)$$

Figure 2B:
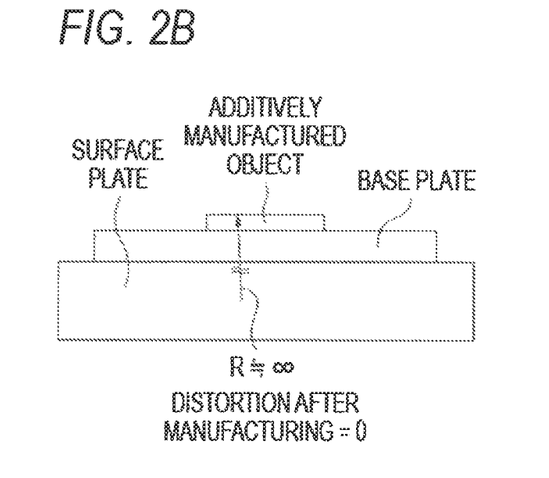
FIG. 2B illustrates the case where the curvature radius R is almost 0.
Figure 2C:
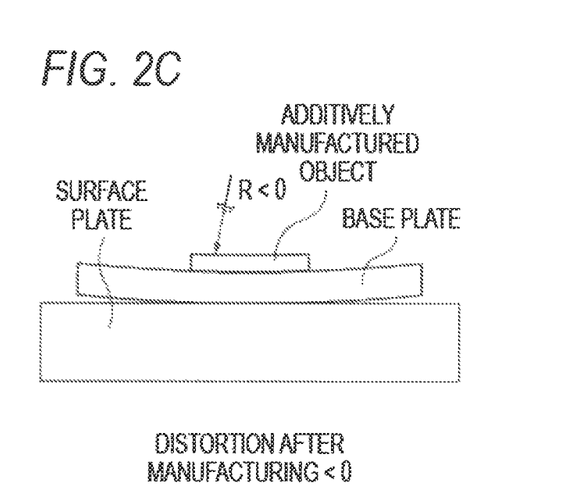
FIG. 2C illustrates the case where the curvature radius R is less than 0.
Figure 2D:
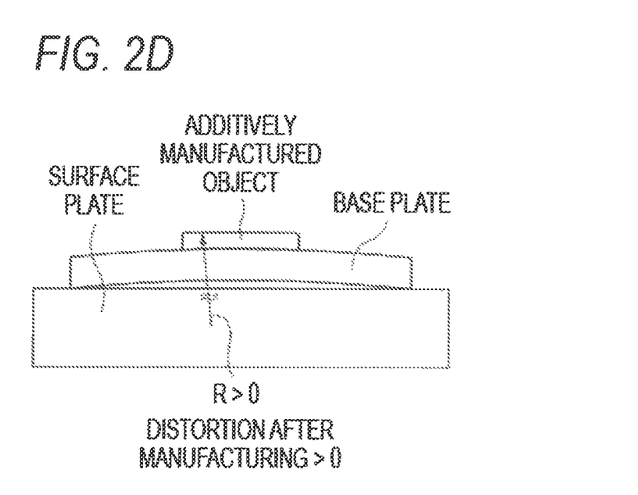
FIG. 2D illustrates the case where the curvature radius R is more than 0.

FIG. 2B illustrates the case where the curvature radius R is almost 0, FIG. 2C illustrates the case where the curvature radius R is less than 0, and FIG. 2D illustrates the case where the curvature radius R is more than 0.

The curvature radius R can also be calculated by placing the base plate on the surface plate, measuring the dimension from the surface plate at regular intervals in the longitudinal direction of the manufactured object with a laser displacement meter or a stylus type dimension-measuring instrument, and approximating the displacements as a circle.

The manufactured object for which the amount of warpage was measured was divided into 5 equal parts parallel to a plane perpendicular to the stacking direction. Cross sections of the five samples were polished, and then observed with an optical microscope to confirm the presence (A) or absence (B) of cracking.

[3. Results]

Figure 3:
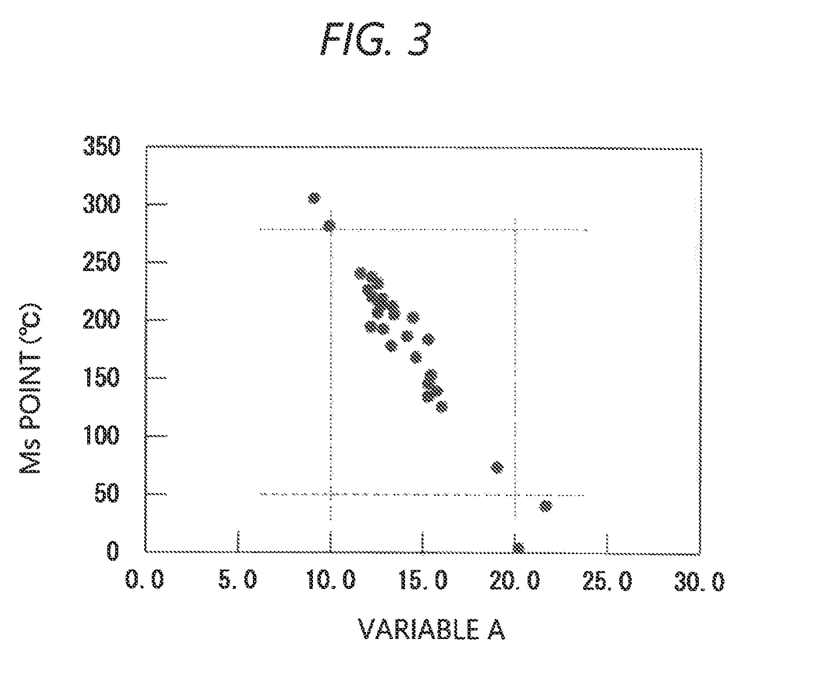
FIG. 3 is a diagram showing a relationship between a variable A and Ms point.
Figure 4:
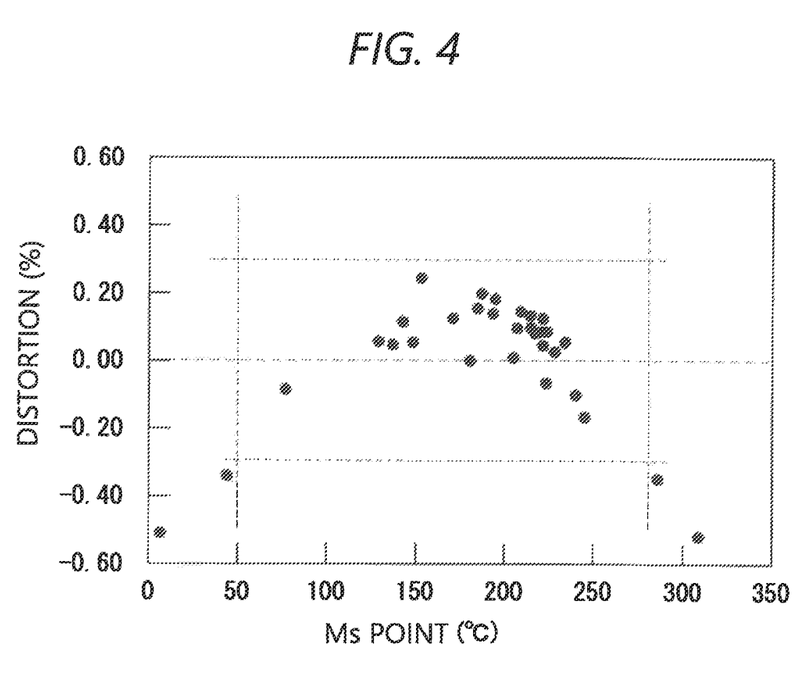
FIG. 4 is a diagram showing a relationship between Ms point and a distortion after manufacturing.

The results are shown in Table 3. FIG. 3 shows a relationship between the variable A and the Ms point. FIG. 4 shows a relationship between the Ms point and the distortion after manufacturing.

TABLE 3

| | Ms point (° C.) | As-manufactured hardness | Cracks | Distortion after manufacturing (%) |
|---|---|---|---|---|
| Example 1 | 233 | 44 | A | 0.06 |
| Example 2 | 205 | 36 | A | 0.01 |
| Example 3 | 217 | 47 | A | 0.09 |
| Example 4 | 214 | 45 | A | 0.14 |
| Example 5 | 209 | 50 | A | 0.15 |
| Example 6 | 184 | 38 | A | 0.16 |
| Example 7 | 224 | 52 | A | 0.09 |
| Example 8 | 244 | 44 | A | −0.16 |
| Example 9 | 239 | 46 | A | −0.10 |
| Example 10 | 141 | 59 | A | 0.12 |
| Example 11 | 207 | 50 | A | 0.10 |
| Example 12 | 228 | 48 | A | 0.03 |
| Example 13 | 153 | 47 | A | 0.25 |
| Example 14 | 75 | 49 | A | −0.08 |
| Example 15 | 192 | 58 | A | 0.14 |
| Example 16 | 170 | 58 | A | 0.13 |
| Example 17 | 147 | 55 | A | 0.06 |
| Example 18 | 127 | 54 | A | 0.06 |
| Example 19 | 222 | 36 | A | −0.06 |
| Example 20 | 214 | 42 | A | 0.10 |
| Example 21 | 221 | 45 | A | 0.09 |
| Example 22 | 221 | 48 | A | 0.05 |
| Example 23 | 186 | 52 | A | 0.20 |
| Example 24 | 220 | 45 | A | 0.13 |
| Comparative Example 1 | 179 | Cannot be manufactured | B | — |
| Comparative Example 2 | 194 | 60 | B | 0.18 |
| Comparative Example 3 | 308 | 36 | A | −0.52 |
| Comparative Example 5 | 42 | 36 | A | 0.34 |
| Comparative Example 4 | 135 | 35 | A | 0.05 |
| Comparative Example 6 | 5 | 37 | A | −0.51 |

TABLE 3-continued

| | Ms point (° C.) | As-manufactured hardness | Cracks | Distortion after manufacturing (%) |
|---|---|---|---|---|
| Comparative Example 7 | 284 | 59 | B | −0.35 |

Table 3, FIG. 3 and FIG. 4 reveal the followings.

(1) In Comparative Example 1, large cracks occurred in the additively manufactured object, and the manufactured object cannot be prepared. It is considered that this is because the amount of C was large, so that the as-manufactured hardness was extremely high, and cracks were likely to occur during solidification.

(2) In Comparative Example 2, cracks occurred in the additively manufactured object. It is considered that this is because the amount of C was large, so that the as-manufactured hardness was high, and cracks were likely to occur during solidification.

(3) In Comparative Example 3, the Ms point was higher than 280° C. It is considered that this is because the amount of Ni was low and the value of the variable A was less than 10. Further, in Comparative Example 3, the absolute value of the distortion after manufacturing was more than 03%, It is considered that this is because the Ms point was high, so that in equipment with a heating temperature of 200° C., the martensite transformation was completed at the same time as the irradiation with the heat source was completed, and the effect of reducing distortion due to transformation expansion could not be obtained efficiently.

(4) In Comparative Example 4, the Ms point was lower than 50° C. It is considered that this is because the amount of Ni was excessive, so that the variable A was more than 20. Further, in Comparative Example 4, the absolute value of the distortion after manufacturing was more than 0.3%. It is considered that this is because the Ms point was near room temperature, so that the martensite transformation did not progress during the manufacturing, and the manufactured object was deformed to be convex downward due to thermal shrinkage.

(5) In Comparative Example 5, the structure of the manufactured object was a full-phase ferrite structure. It is considered that this is because the amount of Cr was excessive and the equivalent ratio ($Cr_{eq}/Ni_{eq}$) was more than 5.6.

(6) In Comparative Example 6, the Ms point was lower than 50° C. It is considered that this is because the amount of Si and the amount of Mn were excessive, so that the variable A was more than 20. Further, in Comparative Example 6, the absolute value of the distortion after manufacturing is more than 0.3%. It is considered that this is because the Ms point was near room temperature, so that the martensite transformation did not progress during the manufacturing, and the manufactured object was deformed to be convex downward due to thermal shrinkage.

(7) In Comparative Example 7, the Ms point was higher than 280° C. It is considered that this is because the amount of Cr was low and the value of the variable A was less than 10. In addition, in Comparative Example 7, the absolute value of the distortion after manufacturing was more than 0.3%. It is considered that this is because the Ms point was high, so that in equipment with a heating temperature of 200° C., the martensite transformation was completed at the same time as the irradiation with the heat source was completed, and the effect of reducing distortion due to transformation expansion could not be obtained efficiently.

Further, in Comparative Example 7, cracks occurred in the manufactured object. It is considered that this is because the Ms point was higher than 280° C. and the as-manufactured hardness was higher as 59 HRC. It is considered that this is because in equipment with a heating temperature of 200° C., the martensite transformation was completed at the same time as the irradiation with the heat source was completed, so that cracks were likely to occur during solidification.

(8) In all of Examples 1 to 24, the absolute value of the distortion after manufacturing was within 0.3%, and no cracks were observed. It is considered that this is because the components were optimized such that the variable A was within a given range, and accordingly, the Ms point was within the appropriate range.

Although the embodiment of the present invention has been described in detail above, the present invention is not limited to the above embodiment, and various modifications can be made without departing from the gist of the present invention.

INDUSTRIAL APPLICABILITY

The metal powder according to the present invention can be used as a powder raw material for producing a mold that requires cooling (such as a die casting mold, a hot stamping mold, and a tailored die quenching mold) through an additive manufacturing method.

What is claimed is:

1. A metal powder, comprising:
  0.22 mass %≤C≤0.45 mass %,
  0.3 mass %≤Si≤3.50 mass %,
  Mn≤2.0 mass %,
  7.5 mass %≤Cr≤21.0 mass %,
  1.5 mass %≤Ni≤7.0 mass %,
  Mo≤1.3 mass %,
  0.05 mass %≤V≤2.0 mass %,
  Al≤0.015 mass %, and
  N≤0.20 mass %,
  with the balance being Fe and unavoidable impurities, satisfying:
  0.05 mass %≤C+N≤0.58 mass %, and
  satisfying the following expression (1) and expression (2):

$$10 \text{ mass \%} \leq 15C+Mn+0.5Cr+Ni \leq 20 \text{ mass \%} \qquad (1), \text{ and}$$

$$Cr_{eq}/Ni_{eq} < 5.6 \qquad (2)$$

where $$Cr_{eq}=Cr+Mo+1.5Si+0.5Nb, \text{ and}$$

$$Ni_{eq}=Ni+30C+30N+0.5Mn, \text{ and}$$

where the characters C, Mn, Cr, Ni, Mo, Si, Nb, and N in the expression (1) and in the definition expressions of $Cr_{eq}$ and $Ni_{eq}$ represent a respective content of each corresponding element in the metal powder in terms of mass %.

2. The metal powder according to claim 1, further comprising:
  0.1 mass %≤Nb≤1.0 mass %.

3. The metal powder according to claim 1, further comprising:
  0.1 mass %≤W≤1.5 mass %.

4. The metal powder according to claim 1, further comprising at least one of:
  P≤0.03 mass %, and
  S≤0.03 mass %.

5. The metal powder according to claim 2, further comprising at least one of:
P≤0.03 mass %, and
S≤0.03 mass %.

6. The metal powder according to claim 3, further comprising at least one of:
P≤0.03 mass %, and
S≤0.03 mass %.

7. The metal powder according to claim 1, further satisfying the following expression (2'):

$$Cr_{eq}/Ni_{eq} < 2.5 \qquad (2').$$

8. The metal powder according to claim 3, further satisfying the following expression (2'):

$$Cr_{eq}/Ni_{eq} < 2.5 \qquad (2').$$

9. The metal powder according to claim 5, further satisfying the following expression (2'):

$$Cr_{eq}/Ni_{eq} < 2.5 \qquad (2').$$

10. The metal powder according to claim 6, further satisfying the following expression (2'):

$$Cr_{eq}/Ni_{eq} < 2.5 \qquad (2').$$

11. The metal powder according to claim 1, which is used for additive manufacturing.

12. The metal powder according to claim 3, which is used for additive manufacturing.

13. The metal powder according to claim 6, which is used for additive manufacturing.

14. The metal powder according to claim 7, which is used for additive manufacturing.

15. The metal powder according to claim 8, which is used for additive manufacturing.

16. The metal powder according to claim 9, which is used for additive manufacturing.

17. The metal powder according to claim 10, which is used for additive manufacturing.

* * * * *